United States Patent
Bogen

(10) Patent No.: US 8,662,590 B2
(45) Date of Patent: Mar. 4, 2014

(54) DEVICE FOR IMPROVED TRAVEL COMFORT

(75) Inventor: Svein Morten Bogen, Brekkesto (NO)

(73) Assignee: Neverland Invest As. (NO)

( * ) Notice: Subject to any disclaimer, the term of this patent is extended or adjusted under 35 U.S.C. 154(b) by 0 days.

(21) Appl. No.: 13/322,832

(22) PCT Filed: May 27, 2010

(86) PCT No.: PCT/NO2010/000194
§ 371 (c)(1),
(2), (4) Date: Nov. 28, 2011

(87) PCT Pub. No.: WO2010/137994
PCT Pub. Date: Dec. 2, 2010

(65) Prior Publication Data
US 2012/0068515 A1    Mar. 22, 2012

(30) Foreign Application Priority Data

May 28, 2009 (NO) .................................. 20092084
May 25, 2010 (NO) .................................. 20100757

(51) Int. Cl.
*A47C 7/38* (2006.01)

(52) U.S. Cl.
USPC ...................................................... 297/393

(58) Field of Classification Search
USPC ............................................. 297/393, 391
See application file for complete search history.

(56) References Cited

U.S. PATENT DOCUMENTS

| | | | |
|---|---|---|---|
| 2,071,319 A * | 2/1937 | Buchanan | 105/354 |
| 3,285,658 A | 11/1966 | Cleveland | |
| 4,031,578 A | 6/1977 | Sweeney et al. | |
| 4,161,946 A | 7/1979 | Zuesse | |
| 4,617,691 A | 10/1986 | Monti et al. | |
| 4,707,031 A | 11/1987 | Meistrell | |
| 5,471,690 A | 12/1995 | McNeil | |
| 6,135,560 A | 10/2000 | Fagg | |
| 6,266,825 B1 | 7/2001 | Floyd | |
| 6,301,716 B1 | 10/2001 | Ross | |
| 6,607,245 B1 | 8/2003 | Scher | |
| 7,004,545 B2 | 2/2006 | Miller | |

FOREIGN PATENT DOCUMENTS

| | | |
|---|---|---|
| FR | 2749491 A1 | 12/1997 |
| GB | 2067893 A | 8/1981 |
| SE | 9901860 A | 11/2000 |
| WO | 2009108823 A1 | 9/2009 |

OTHER PUBLICATIONS

International Search Report for PCT/NO2010/000194, Completed by the Nordic Patent Office on Sep. 26, 2010, 2 pages.

* cited by examiner

*Primary Examiner* — Milton Nelson, Jr.
(74) *Attorney, Agent, or Firm* — Brooks Kushman P.C.

(57) ABSTRACT

Headrest and method for relieving of neck and throat muscles for a sitting person. The headrest includes a headband arranged to be able to be led around the person's head, a seat band arranged to be able to be fastened to a portion of the back of a chair, and a neckband connecting the forehead portion of the headband with the seat band. The headband is displaceably arranged in the longitudinal direction of the neckband.

9 Claims, 1 Drawing Sheet

DEVICE FOR IMPROVED TRAVEL COMFORT

CROSS-REFERENCE TO RELATED APPLICATION

Figure 1:
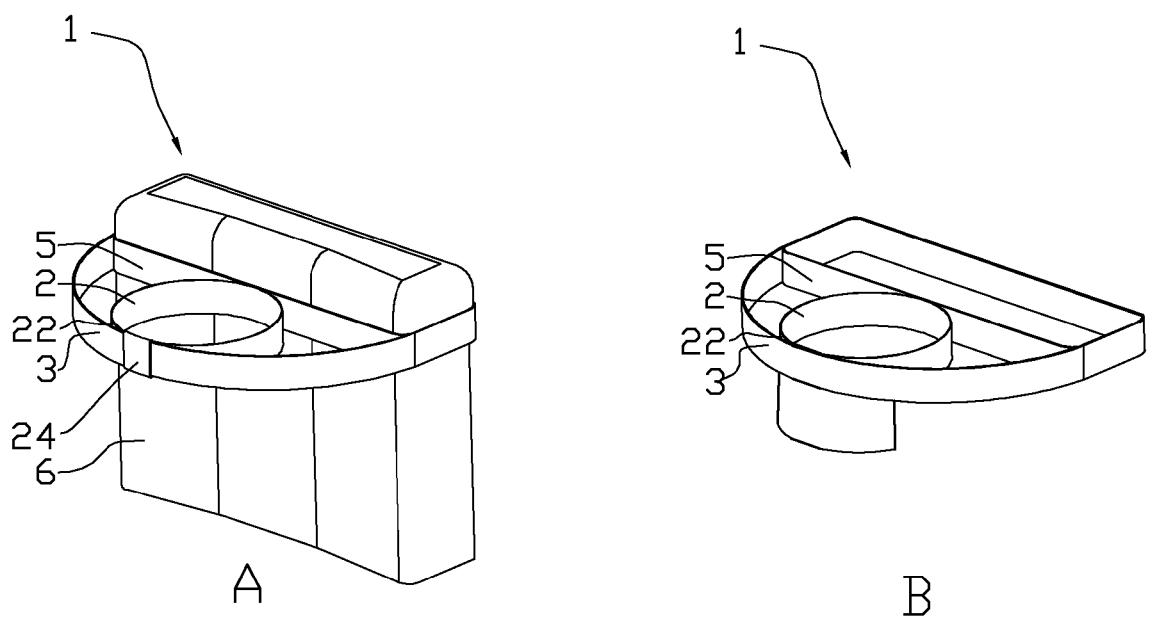

This application is the U.S. national phase of PCT Appln. No. PCT/NO2010/000194 filed May 27, 2010 which claims priority to Norwegian application 20092084 filed May 28, 2009 and Norwegian application 20100757 filed May 25, 2010, the disclosures of which are incorporated in their entirety by reference herein.

The invention relates to a device for increasing travel comfort in longer journeys. More particularly the invention relates to a device giving relief for neck and throat muscles and at the same time holds the head in a firm enough grip so that a person sitting in a chair or similar may take up a comfortable sleeping position.

Persons travelling by car, bus, train or plane and also by boat, spend most of the travelling time seated in a chair. Particularly in long journeys, but sometimes also in short journeys, it is desirable to find a comfortable seated position allowing a person to dose or sleep. It is well known that the head then easily falls to one side or forward, which gives an unpleasant seated position and which may also lead to a person waking up. Neither is it comfortable to sit in the same position the whole time. It is desirable to be able to turn one's head, turn the upper part of the body and be able to shift back and forth in the seat.

The problem is only partly relieved by the angle of the back of a chair being adjustable. In many cars, buses, trains or planes the back of the chair may not be inclined so far backwards that the head is supported well enough for a person to take up a comfortable sleeping position. Consideration for other passengers possibly seated in a row of chairs behind, also limits the possibility to lean the back of the chair sufficiently backwards.

It is known to use firm or inflatable horseshoe-shaped pillows or collars to give the head sufficient support. Such pillows or collars may also be given other forms such as described in for example the patent documents U.S. Pat. No. 4,031,578; U.S. Pat. No. 4,617,691; U.S. Pat. No. 5,471,690 and U.S. Pat. No. 6,135,560. A drawback in several of these solutions is that the head is not prevented from falling sharply forward, which often leads to the person waking up. Pillows lying around the throat may also be experienced as uncomfortable.

It is further known that the head may be stabilised with differently formed support devices, which in some portions are in contact with a person's head. Patent document U.S. Pat. No. 3,285,658 mentions a chin sling running around the chin portion of the person and which on each side of the head is fastened to the upper portion of a chair. This solution has several drawbacks. It is difficult to turn the head from side to side. The solution does not permit the person to move back and forth on the seat of the chair and the solution presupposes the back of the chair to be so high that the chin sling may be fastened at a height above the person's head. Patent document U.S. Pat. No. 4,161,946 mentions a loop or a strap resting against a person's forehead and being connected with a fastener device behind the neck and where the fastening device behind the neck is supported in an abutment against the person's chest. This solution has the drawback that it is lumpy and uncomfortable and does not allow the person to turn the head from side to side. Patent document U.S. Pat. No. 7,004,545 describes a headrest consisting of a support part being placed loose between a person's back and a seat back and is held in place by the person's weight or pressure against the seat back. A band running around the person's head and holding it fixed in a position against the support part is fastened to the upper portion of the support part. This solution has the drawback that the support part is relatively long and takes up space in the person's luggage when not in use. The opportunity of the person to displace him/herself back and forth on the seat of the chair is also limited. Patent document U.S. Pat. No. 6,301,716 describes a headrest particularly for disabled persons. The headrest comprises a headband, which is fastened to the back of a chair or similar with cords fastened to the neck portion of the headband. This rest is designed to give the head so large freedom of movement that it is not suitable for a person wanting to sleep comfortably.

Patent document U.S. Pat. No. 6,266,825 describes a headrest in two parts. A first part consists of a chair harness placed around the back of a chair and fastened to itself by means of portions of the chair harness being provided with such as a velcro. The chair harness is relatively inflexible. A second part consists of a relatively inflexible neck harness led over the person's forehead. The neck harness is in its end portions provided with fastening means such as velcro being fastened to the front portion of the chair harness. The neck harness is thus not in contact with the whole head circumference of the user. The neck harness may be provided with a damper element in the form of a cushion in the forehead portion of the neck harness. The seat harness may be provided with a neck cushion in its front portion. This solution has the drawback that it limits the possibility of the person to turn his/her head from side to side. The person may not either displace him-/herself back and forth on the seat of the chair without the neck harness coming out of position and thereby loosing its support function. The solution also presupposes a sufficiently high chair back to fasten the chair harness high enough.

Patent documents GB 2,067,893; WO2009/108823 and U.S. Pat. No. 4,707,031 describe different embodiments of headrests having a headband and a seat band and such that the headband is fastened to the seat band in the neck portion of the headband. GB 2,067,893 teaches that the seat band is provided with elastic bands, which may be tied together to adapt the seat band to the back of a chair. The headband neck portion is fastened to the seat band with a rivet or a staple. In an alternative embodiment the fastening may be constituted by a short rope between the seat band and the headband. The headband is adjustable lengthwise by the end portions being provided with an attachment material such as velcro. The seat band and the headband of the headrest are made from an inflexible material such as paper, making them suitable for disposability. WO2009/108823 teaches a seat band being fastened around a back of a chair. The seat band is in its front portion provided with an attached metal plate. A flexible headband is in its neck portion provided with a magnet. The magnet cooperates with the metal plate so that the head is held steady. U.S. Pat. No. 4,707,031 teaches a seat band being fastened around the back of a chair and such that the length adjustment is done by means of a buckle. A headband is in its neck portion fastened by sewing to the front portion of the seat band. The length of the headband may be adjusted by means of fastening means such as a velcro. For further stabilisation of head movements sideways, the headrest is provided with neckbands, which on either side of the head is fastened to the forehead portion of the headband and fastened to the front portion of the chair band. In an alternative embodiment, specially for children in a children's car seat, the seat band is in its front portion provided with a velcro and a headband is in its neck portion provided with a velcro complementary to the velcro of the seat of the chair, and such that the headband is releasably fastened in its neck portion and to the front portion of the seat band. One drawback with these solutions is that the head is nearly locked in one position. This is felt uncomfortably over time, as a sleeping person desires to take up different body positions, for example turn the body from one side to the other. It is most natural that the head may go along with these movements. Another drawback is that the headband fastened in the neck portion of the headband to the seat band will slide up over the back of the head and off the head when the sleeping person edges forward on the seat cushion in the chair. Thereby the headband will no longer give support to the head. Patent document U.S. Pat. No. 6,607,245 describes a headrest giving a limited but flexible support for the head. This is achieved by the headrest being constituted by a seat band, a headband and two neckbands connecting the forehead portion of the headband with the seat band. The length of the seat band is adjusted to the back of the chair by means of a buckle, or the seat band may be flexible. The headband is arranged to be placed around the head of the user. The headband may be flexible and formed as a continuous band, or it may be lengthy and provided with fastening means in the ends for length adjustment. Two neckbands further constitute the headrest, one on either side of the head. The neckband may be flexible and may be fastened to the forehead portion of the headband with a seam or releasably fastened by means of a velcro. The neckband is releasably fastened to the seat band by means of such as a velcro. The head may be moved some due to the neckband being flexible at the same time as the freedom of movement may be adjusted by adjusting the tension in the neckband by changing the fastening point of the neckband in the seat band. The headrest consists of at least two parts: the seat band and the combined headband and neckband, or have four parts when the two neckbands are releasably fastened to the headband.

Patent document U.S. Pat. No. 6,607,245 thus describes a headrest overcoming some of the comfort problems not being solved by other prior art, but the head has still not adequate freedom of movement for the user to get a comfortable sleep. The person must overcome the neckband flexibility when the head is turned to one side, and the neckband will thus pull the head back to the initial position. Velcro is well suited for quick and precise fastening and adjustment, but has also several drawbacks. It is well known that the hook portion of the velcro is filled with fibres over time reducing the fastening properties of the hook portion. When the headrest is packed in for example a bag, care must be taken in packing so that the hook portion is connected to a loop portion or that the hook portion is otherwise covered to avoid the hook portion hooking itself to other fabrics such as clothing or the fabric of the bag itself. The hook portion and the loop portion of a velcro are constituted of an inflexible material and thereby reduce the flexible length of a band provided with a velcro. It is also a drawback that the headrest is constituted by several parts, as the various parts may go astray, or that one of the parts is left behind when the seat is vacated after the end of the journey.

Persons wishing to sleep often experience improved sleep comfort when in addition to a good headrest also shielding from light and noise is seen to. For these purposes there are known eye masks of different designs, and earplugs and earmuffs. Patent document U.S. Pat. No. 4,707,031 shows that the headband is placed over the eyes while patent document U.S. Pat. No. 6,607,245 shows a piece of cloth fastened to the inside of the headband forehead portion and may be turned down over the eyes.

The object of the invention is to remedy or reduce at least one of the disadvantages of the prior art, or at least obtain a new alternative to the prior art.

The object is achieved by the features disclosed in the below description and in the subsequent claims.

The first object of the invention is to obtain a headrest giving good relief for neck and throat muscles for a traveller sitting in an upright position. A second object is that the headrest ensures that the head cannot fall forward abruptly. A third object is that the person shall have the freedom to move in the chair to be able to take up varying sitting positions, for example by being able to ease him/herself back and forward in the seat of the chair, turn the body from side to side and be able to turn the head from side to side. A fourth object is that the headrest shall take up little room when not in use. A fifth object is that it is easily fitted and disassembled. A sixth object is that it shall be arranged to be able to have light shielding and soundproofing incorporated.

By a sitting person is in the following meant, for example, but not limited to a person sitting in a sitting device such as a chair in a car, in a bus, in a plane and in a boat. By sitting device is also meant such as a seat of a chair, a bench, a cushion, a sack and a strap seat. By a back of a chair is meant such as, but not limited to, a back of a chair, a neck rest and a wall cushion. The back of the chair may be arranged independently of the sitting device.

In a first aspect the invention relates to a headrest for relieving of neck and throat muscles for a sitting person wherein the headrest comprises a headband arranged to be able to be lead around the person's head; a seat band arranged to be able to be fastened to a portion of the back of a chair; a neckband connecting the forehead portion of the headband with the seat band, wherein the headband is displaceably arranged in the longitudinal direction of the neckband. The seat band may be constituted of a flexible material. The flexible material may be an elastic type material. The seat band may be ring-shaped. This has the advantage that it may be threaded down the back of a chair or a neck rest of different dimensions without the length of the seat band is adjusted by means of such as a buckle to be adapted to the circumference of the back of the chair or the neck rest. The seat band may on a portion facing the back of the chair be provided with a friction material. This has the advantage that the seat band is not displaced in the vertical direction on the back of the chair. The seat band will neither be displaced in the horizontal direction. The seat band thereby forms a stable fastening for the headrest. A gummed material of a per se known type may constitute the friction material. The gummed material may be applied to the seat band with glue or be fixed to the seat band by a seam or with glue or in another known way.

A flexible material may constitute the headband. In one embodiment an elastic type material may constitute the flexible material and another textile material such as wool, cotton or synthetic fleece or a fibre mixture of known type may surround the flexible material. This has the advantage that the headband may lie enclosing against the head without being felt uncomfortable. Particularly advantageously the headband may be arranged to be placed over the eye bow portion of the person. This may be done in a comfortable way as the headband is constituted by a flexible textile material. This has the advantage that the headband is well attached to the head and will not slip off the head even if the person slides him/herself forward in the seat of the chair.

A flexible material may constitute the neckband. This has the advantage that the head may be moved a little forward at the same time as the tightening of the neck band will prevent the head from falling forward. The neckband may be constituted by one continuous band where the first end portion of the neckband in the operating position may be fastened to the seat band on the first side of the head and the second end portion of the neckband may be fastened to the seat band on the second side of the head. This has the advantage that the neckband and the seat band form one unit. The neckband may be fastened to the seat band with a seam.

The flexible material of the seat band, the headband or the neckband may be constituted of such as elastan or Lycra®, or of a textile mixture comprising a flexible textile fibre of a per se known type.

The headband may in its forehead portion be provided with a guide arranged to house the neckband. The guide may be arranged so that the headband may be displaced along the neckband in the longitudinal direction of the neckband. The guide may in one embodiment be formed as two slits in the forehead portion of the headband. The neckband may be threaded through said slits. In an alternative embodiment the guide may be formed as a piping. The piping may be constituted by a piece of textile sewn on to the forehead portion of the headband and such that the neckband may be threaded through the piping between the headband and the sewn on piece of textile. In an alternative embodiment the piping may be formed as a loose sleeve lying around both the headband and the neckband. The guide may in a further alternative embodiment be constituted by a plastic or metal buckle. The buckle may be sewn onto the headband or be fastened in another known way. The buckle may be provided with slits where the neckband may be threaded through. The buckle may also be provided with further slits where the headband is threaded through such that the buckle is displaceable relative to both the headband and the neckband. This has the advantage that the person may turn the head sideways without being hindered in the turning movement by the neckband, at the same time as the forehead portion of the headband keeps in contact with the neckband and thereby prevents the head from falling to the side or forward. It is a further advantage that the headband, neckband and seat band constitute one unit being kept together. The person skilled in the art will know that the neckband being provided with a guide arranged to house the headband may also achieve the purpose of the headband being displaceably fastened to the neckband.

The forehead portion of the headband may be provided with an eye mask of a per se known type for improved travelling comfort. The eye mask may be fixed or removable and it may further be tilted up or down as need be. It may also be an advantage if the headrest may be further provided with a means for soundproofing, for such as earplugs or earmuffs of per se known types. Earplugs may for example be fastened to the headrest by strings.

In a second aspect the invention relates to a method for relief of neck and throat muscles for a sitting person by the use of the headrest described above. The method comprises the steps of placing the seat band around the back of a chair and placing the headband around a person's head in such a way that the forehead portion of the headband is placed over the eye bow portion of the person. This has the advantage that the headrest is quickly put in the desired place without the use of length adjustment means such as buckles or velcros. It has further the advantage that the positioning of the headband over the eye bow will prevent the headband from sliding off the head when the person moves forward on the chair seat.

Figure 2:
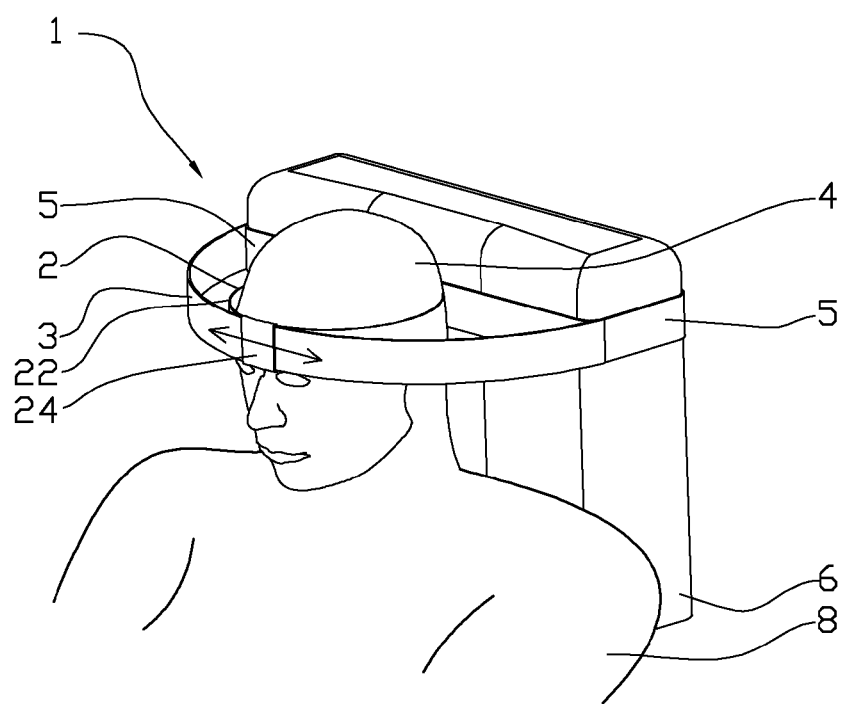

In the following are described examples of a preferred embodiment illustrated in the accompanying drawings, wherein:

FIG. 1 shows schematically the headrest seen slantwise from the front in the operating position fastened to a seat back; and FIG. 2 shows the headrest shown in FIG. 1 fastened to the head of a sitting person.

In the figures the reference numeral 1 indicates a headrest in accordance with the invention. In FIG. 1 the headrest 1 is shown slantwise from the front. A headband 2 lies around a person's head 4. In the figures the headband 2 is shown approximately circular to clarify the invention. This is nevertheless to be understood such that the headband 2 in use will lie tightly enclosing the head 4. The headband 2 may be provided with at least one portion flexible in length of per se known type, such as Lycra®, elastan, polyamide or a fibre mixture containing flexible textile fibres. The headband 2 is thus adapted to lie comfortably, enclosing about a head 4 and will be adapted to different size heads 4.

The headrest 1 is provided with a neckband 3 connecting the headband 2 with a seat band 5 on either side of the head 4. The neckband 3 may be provided with least one portion flexible in length of a per se known type, such as an elastic, or be constituted by a flexible textile material such as Lycra®, elastan, polyamide or a fibre mixture containing flexible textile fibres. The neckband 3 may be adjustable in length by means of a not shown length adjustment device, such as a length adjustment buckle. In an alternative embodiment the length adjustment device may be a portion on the neckband arranged with hooks and loops, for example a velcro of known type.

The seat band 5 is led continuously around the back of a chair 6. It may be an advantage if the seat band 5 in a portion lying against the back 6 of the chair is provided with a friction material giving increased attachment against the back 6 of the chair, for example a gummy type material. This will prevent the seat band 5 being displaced relative to the back 6 of the chair.

The headband 2 is provided with a guide 24 arranged to house the neckband 3 is such a way that the headband 2 is displaceably fastened to the neckband 3 and may be displaced along the neckband 3 in the longitudinal direction of the neckband 3 as indicated with an arrow. A sleeve fastened to the headband 2, wherein the neckband 3 is threaded through the guide 24, may constitute the guide 24. In an alternative embodiment a piping constitutes the guide 24 where the outward facing side of the headband 2 constitutes the one inner side portion of the piping. In a further alternative embodiment (not shown) the guide 24 is formed by two slits in the forehead portion 22 of the headband 2 and such that the neckband 3 is threaded through said slits. In a further alternative embodiment the guide may be constituted by a buckle (not shown) of plastic or metal. The buckle may be sewn to the forehead portion 22 of the headband 2 or be fastened in another known way. The buckle may be provided with slits that the neckband 3 may be threaded through. The buckle may also be provided with further slits that the headband 2 is threaded through so that the buckle is relatively displaceable to both the headband 2 and the neckband 3. The person skilled in the art will know that in a further alternative embodiment the neckband 3 may be provided with a guide 24 arranged to house the headband 2 in a way corresponding to the one described above. The guide 24 ensures that a person may move back and forth in the seat without the head 4 loosing support. The headband 2 may further be provided with not shown cushions or padding material to improve travelling comfort.

As shown in FIG. 2 the headband 2 may be positioned above the eye bows of the person 8. The headband 2 is constituted by a flexible material causing this to be done in a comfortable way at the same time as the headband 2 does not slide off the eye bows. This results in additional freedom of movement for the person 8 without the headband sliding off or coming loose from the head 4.

The invention claimed is:

1. A headrest for relieving of neck and throat muscles for a sitting person, comprising:
   a headband arranged to be fitted around the person's head;
   a seat band arranged to be fastened to at least a portion of a back of a chair;
   a neckband connecting a forehead portion of the headband with the seat band; and
   a guide slidably connecting the headband and neckband at the forehead portion of the headband, wherein the guide provides a guided path for relative movement between the headband and the neckband;
   wherein the headband is displaceably arranged in the longitudinal direction of the neckband.

2. The headrest in accordance with claim 1, wherein the neckband is constituted by one singular band extending from a first end portion and a second end portion, the first end portion of the neckband is fixedly fastened to the seat band and the second end portion of the neckband is fixedly fastened to the seat band.

3. The headrest in accordance with claim 1, wherein a portion of the seat band is configured to face the chair, the portion being provided with a friction material.

4. The headrest in accordance with claim 1, wherein the headband is constituted by a flexible material.

5. The headrest in accordance with claim 1, wherein the headband is arranged to be placed above an eyebrow portion of the person.

6. The headrest in accordance with claim 1, wherein the neckband is constituted by a flexible material.

7. The headrest in accordance with claim 1, wherein the seat band is constituted by a flexible material.

8. The headrest in accordance with claim 7, wherein the flexible material is constituted by a flexible textile material.

9. A headrest for relieving of neck and throat muscles for a sitting person, comprising:
   a headband arranged to be fitted around the person's head;
   a seat band arranged to be fastened to at least a portion of a back of a chair;
   a neckband connecting a forehead portion of the headband with the seat band, the neckband being constituted by one singular band extending from a first end portion and a second end portion, the first and second end portions each fixedly fastened to the seat band; and
   a guide slidably connecting the headband and neckband, wherein the guide provides a guided path for relative movement between the headband and the neckband;
   wherein the headband is displaceably arranged in the longitudinal direction of the neckband.

* * * * *